INVENTOR

WERNER A. SCHÜLER

BY Mason, Fenwick & Lawrence
ATTORNEYS

Nov. 12, 1968 W. A. SCHÜLER 3,410,737

METHOD FOR PRODUCING SEMICONDUCTOR NUCLEAR PARTICLE DETECTORS BY DIFFUSING

Filed May 3, 1965 2 Sheets-Sheet 2

INVENTOR

WERNER A. SCHÜLER

BY Mason, Fenwick & Lawrence

ATTORNEYS

United States Patent Office 3,410,737

Patented Nov. 12, 1968

3,410,737

METHOD FOR PRODUCING SEMICONDUCTOR NUCLEAR PARTICLE DETECTORS BY DIFFUSING

Werner A. Schüler, Oak Ridge, Tenn., assignor to Oak Ridge Technical Enterprises Corporation, Oak Ridge, Tenn., a corporation of Tennessee Filed May 3, 1965, Ser. No. 452,543
4 Claims. (Cl. 148—186)

The present invention relates in general to the production of semiconductor nuclear particle detectors for detecting high energy charged particles and $\gamma$-rays, and the like, and more particularly to lithium drifting apparatus for silicon and germanium radiation detectors, wherein a continuous measurement is made of the distance of the lithium-drifted region from the opposite face of the wafer while the drifting proceeds.

In semiconductor nuclear particle detectors the linear relationship one wants between the incident particle energy and the pulse height spectrum exists only if the incident particle loses all its energy in the depletion region. For this to occur for high energy charged particles or even for $\gamma$-rays, which are more penetrating than most of the other nuclear particles, the sensitive region (depletion region) must be at least as deep as the range of these particles or rays in the semiconductor material. In ordinary p-n junctions the depth of the depletion region is limited by the break-down voltage of the detector, probably the configuration and the availability of silicon with a very high resistivity. E. M. Pell, in his paper entitled "Ion Drift in a n-p Junction," published in the Journal of Applied Physics, 31 (2), 291, (1960), has shown that lithium (a donor) can be drifted into p-type silicon by applying at a temperature of 100–150° C. reverse bias to an n-p junction consisting of a lithium diffused n-region in p-type silicon. He finds that the amount of drifted lithium adjusts itself to exactly compensate the acceptors in the bulk material. This results in the formation of a layer of very high resistivity material that grows from the n-type diffused layer into the p-type material. This is frequently referred to as an n-i-p detector. In order not to lose this configuration by excessive drifting—which means compensation of all the p-type material—one has to stop the drifting process leaving a preferably shallow p-layer on top of the compensated region. The thickness of this p-type layer, which is mostly used as the particle entrance "window," should be as thin as possible, because the energy loss in this region does not contribute to the output pulse of the detector.

Drifting methods known to the prior art are subject to several disadvantages. In early types of silicon lithium-drifted detectors the problem of charge injection from the face opposite the lithium side was avoided by drifting only part way through the silicon. This resulted in rather thick windows, unsatisfactory for many purposes. It has now become standard practice to drift completely through the silicon slice. By forming a surface barrier on such a device a very thin window can be achieved. The determination of the thickness of the undrifted region during the drift process is either not carried out at all or is being done by resistivity measurements at the face opposite the lithium side. In the first case, the charge injection from the face opposite the lithium side is used as indication for zero window thickness. This method results in slightly overdrifted wafers and has no possibility of stopping the drift process at a given window thickness. In the second case, the change in the resistivity of the silicon slice due to the compensation by the lithium is used as an indication of the thickness of the undrifted region. This method requires a special detector configuration and shows an indication which is dependent on the resistivity of the undrifted region. It cannot be applied for wafers with a low resistivity $p^+$ layer at the face opposite the lithium region.

The above disadvantages may be overcome by using a method in which the indication is only dependent on the window thickness or thickness of the undrifted region itself.

An object of the present invention is the provision of a novel process and apparatus for drifting of semiconductor nuclear particle detector wafers in a manner affording accurate control of ultimate window thickness.

Another object of the present invention is the provision of a novel process and apparatus for regulating lithium drifting of silicon and germanium radiation detector wafers wherein indications are continuously obtained during the drifting process of the thickness of the window or undrifted region.

Another object of the present invention is the provision of a novel process and apparatus as described in the immediately preceeding paragraph, wherein continuous measurement of window thickness during drifting is made by irradiation of the wafer with a pulsed light source and measurement of pulses created by carriers produced in the wafer responsive to the pulsed light source radiations.

Other object advantages and capabilities of the present invention will become apparent from the following detailed description, taken in conjunction with the accompanying drawing illustrating a preferred embodiment of the invention.

Figure 1:
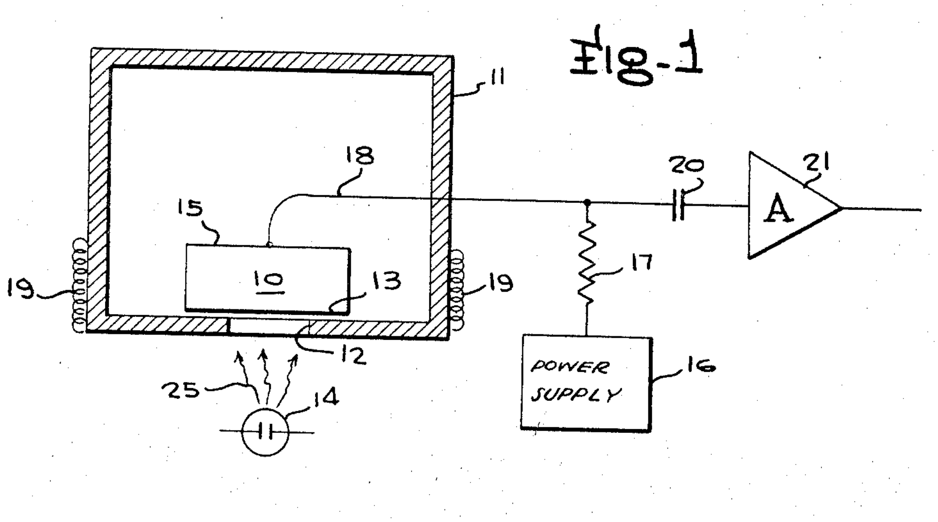
FIGURE 1 is a diagrammatic view of the basic apparatus employed for drifting radiation detectors in accordance with the present invention.

The basic wafer to be subjected to the process of the present invention to form a radiation detector is of a known type, for example a solid state semiconductor wafer of silicon wherein the n-region is formed by diffusion of lithium and which has an i-zone (intrinsic zone) characterized by very high specific resistivity which is achieved by a compensation process—the lithium-ion-drift-process. Further description of such wafers may be found in the article entitled Semiconductor Nuclear Particle Detectors by E. M. Pell in the National Academy of Science Publication 871 and in his previously mentioned paper in the Journal of Applied Physics, 31 (2) 291 (1960). This basic wafer, when processed in accordance with the present invention, is ion drifted while being held at a temperature between 90° C. and 150° C. and a reverse bias is applied to the wafer. Maintenance of such temperature and reverse bias conditions is in accordance with prior procedure in drifting detectors. However, the process and apparatus of the present invention involves use of the wafer itself as a radiation detector during the drifting process, so as to permit accurate determination of the window thickness and termination of the drifting process at the proper moment.

Referring to the drawings for an understanding of the details of the process and particularly referring to FIG- URE 1, the silicon wafer indicated generally by the reference character 10 is positioned in a light-tight container 11 adjacent to a radiation admitting aperture 12 therein, so as to partly or totally expose the face 13 of the wafer 10 to radiations of a gaseous discharge source 14, which may for example be a General Electric neon glow lamp, type A1–B or an argon glow lamp, type AR–1, to generate recombination radiation which has discrete lines within the range of visible light to produce carriers in the wafer due to a transfer process. The energy of the single light particles or photons is directly transferred to the silicon atoms which leads to ionization of the latter and thus generation of quasi-free carriers.

The face 15 of the wafer 10, opposite the face 13, is the face adjacent the lithium diffused or n-region of the wafer. A reverse bias derived from a suitable power supply 16 is supplied to the wafer 10 through a suitable resistor 17 and a lead 18 electrically joined to the face 15 of the wafer 10, as diametrically illustrated in FIGURE 1. The container 11 and the wafer 10 are heated by suitable heating coils 19 to maintain the wafer within the desired temperature range. Current pulses created by the wafer 10 responsive to irradiation thereof by the radiation source 14 are fed through lead 18 and capacitor 20 to an amplifier 21.

Figure 2:
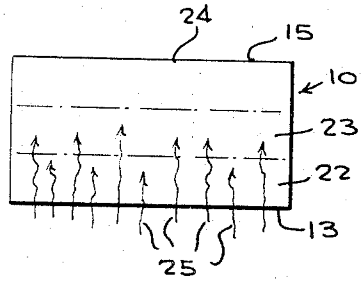
FIGURE 2 illustrates the structure of a p-i-n detector.

To more fully understand the action occurring in the wafer 10 during the drifting thereof, FIGURE 2 illustrates a silicon wafer 10 which is only part way drifted through the silicon.

The different zones of the wafer 10 are indicated diametrically in FIGURE 2 by broken line separation of the zones, the p-zone being designated by the reference character 22, the compensated i-zone by reference character 23 and the lithium diffused zone by the reference character 24.

The radiation 25 emanating from the radiation source 14 has to penetrate the p-zone 22 to reach the compensated i-zone 23. The lithium diffused zone 24 and the p-zone 22 have, compared with the i-zone 23, a very low resistivity. When a reverse bias is applied, the field strength in the i-zone 23 is therefore much higher than in the lithium-diffused zone 24 and in the p-zone 22. As carriers are produced through the several zones of the wafer responsive to the radiation light energy, the carriers produced in the i-zone 23 are therefore much quicker separated and collected than those produced in the p-zone 22 and in the lithium-diffused zone 24. Pulses created by carriers produced in the i-zone 23 have, as a result of the previous, a much faster rise time than pulses created by carriers in one of the low resistivity zones. By using a light source with a fast rise time, such as the gaseous discharge lamp 14, and an amplifier 21 with a short clipping time, the pulse height at the output of the amplifier 21 will only be proportional to the number of carriers produced in the i-zone 23, in this case the p-zone will only act as a window.

Figure 3:
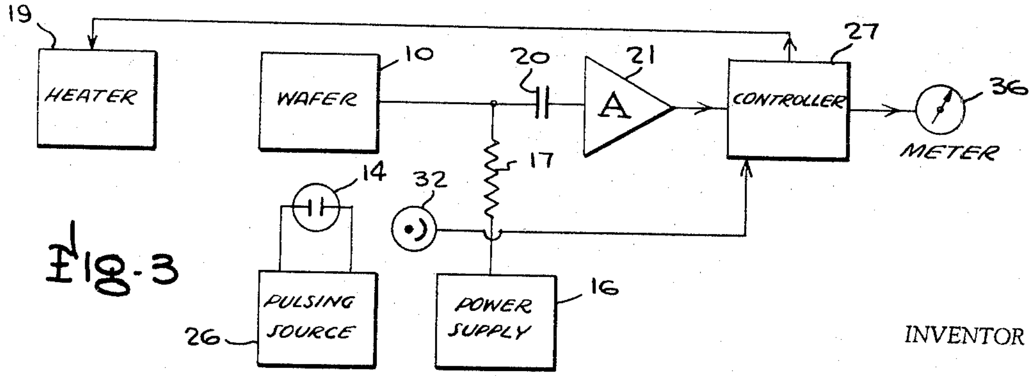
FIGURE 3 is the block diagram of the ion drifting system of the present invention.
Figure 6:
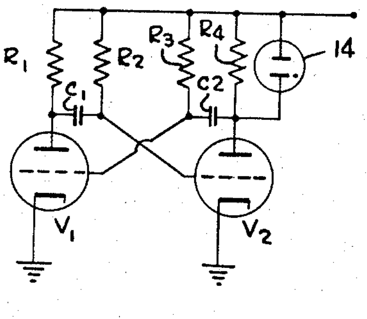
FIGURE 6 is a schematic diagram of a pulsing source which may be used to operate the gaseous discharge bulb in the system of FIGURE 3.

Referring now to FIGURE 3, there is shown a block diagram of a complete system for carrying out the process of lithium drifting of the wafer while effecting concurrent measurement of the thickness of the undrifted region. The silicon wafer 10 is heated by the heater 19 to maintain the desired temperature between 90° C. and 150° C. and a drift voltage, for example of about 200 volts D.C., is supplied to the wafer from the power supply 16 via the resistor 17. The gaseous discharge light source 14 is pulsed by a suitable pulsing source, generally indicated by block 26, which may for example be a well known assymetrical multivibrator circuit of the type shown in FIGURE 6 having triodes $V_1$ and $V_2$, resistors $R_1$, $R_2$, $R_3$ and $R_4$, and condensers $C_1$ and $C_2$, the gaseous discharge lamp 14 being connected between the B+ supply for the circuit and the plate of $V_2$ across the plate load resistor of $V_2$. A detailed description of these multivibrators and the principle of operation as well as the design principles thereof are given in the book "Pulse and Digital Circuits," by J. Millman and A. H. Taub, McGraw-Hill Book Co., Inc., 1956.

The pulse light source 14 thus produces carriers in the silicon wafer 10, the resulting carrier pulses being fed through the condensers 20 to the charge sensitive amplifier 21 which has a short clipping time in the microsecond region. Short clipping time amplifiers which would satisfactorily perform the required operation are for example, described by E. Fairstein, J. L. Blankenship, and C. J. Borkowski, in the article entitled Solid State Radiation Detectors, Institute Radio Engineers publication N.S. 8, No. 1 (January 1961), or amplifiers manufactured by Oak Ridge Technical Enterprises Corporation under the designation Amplifier System 101–201.

Figure 4:
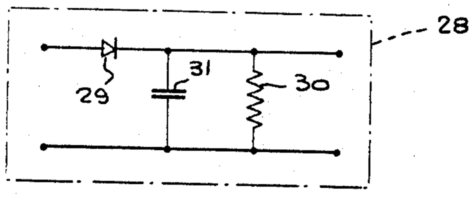
FIGURE 4 is a schematic diagram of an example of a peak rectifier circuit which may be used in the system of FIGURE 3.
Figure 5:
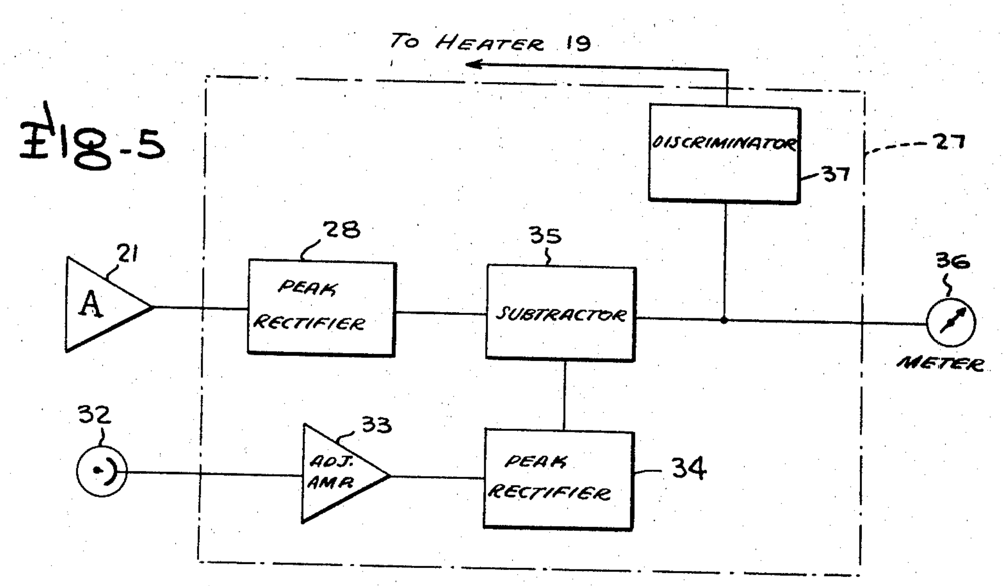
FIGURE 5 is a block diagram of details of an exemplary controller unit which may be used in the system of FIGURE 3.

The pulse heights at the output of the charge sensitive amplifier 21 are proportional to the charge created in the i-region 23 of the silicon wafer 10. These pulses are fed to a control system 27 which compares these pulse heights with pulses of a height which is proportional to the light intensity of the pulsed light source 14. An example of such a controller system is illustrated diagrammatically in FIGURE 5, which employs a peak rectifier 28 to produce a D.C. rectified output proportional to the pulses derived from amplifier 21. The peak rectifier 28 may be of the type schematically illustrated in FIGURE 4, the alternating current input of frequency $f$ being rectified by rectifier diode 29 to produce a D.C. voltage at the resistor-capacitor combination of resistor 30 and condenser 31, and the time constant $\tau=RC$ is large compared with the factor $1/F$ (e.g., $\tau=10/f$). To provide an appropriate representation of the light intensity of the light source 14 for comparison with the rectified D.C. representation of the current pulses created by the wafer, a photocell 32 (such as the Electro-Nuclear silicon photo diode PD–9000–1) is disposed to respond to the light output of light source 14 and apply a related signal to adjustable linear amplifier 33 producing pulses which are rectified by peak rectifier 34, similar to peak rectifier 28, to provide a D.C. voltage proportional to the light source intensity pulses. The outputs of the two peak rectifiers 28 and 34 are subtracted by subtractor circuit 35 to produce a resulting voltage which is directly fed to meter 36. The amplification of amplifier 33 is adjusted so that the pulse height at its output is the same as the output pulse height of amplifier 21 for the case of the zero window thickness of the detector wafer 10. A discriminator 37 is also coupled to the output of subtractor 35 and to the heater 19 to switch off the heater when the voltage output of subtractor 35 drops below a selected value. A suitable discriminator may employ the well-known "Schmitt-trigger" type circuit.

The meter 36 is calibrated in terms of the thickness of the undrifted region. By observation of the readings of meter 36 during irradiation of the wafer 10 by the light source 14, the supply to heater 19 can be terminated when the meter indicates that the desired window or undrifted region has been reached. This can be ascertained with great accuracy as the wafer itself is being used as a detector of the radiation generated by source 14 during the drifting process to produce fast rise time carriers and consequent pulses which are representative of the thickness of the i-zone. As a specific example, the process can be conducted in the manner hereinabove described and the indications of the meter 36 visually monitored until a p-type region thickness of 5 $\mu$m. is indicated, whereupon the system may be manually de-energized by suitable switch means (not shown). The discriminator 37 may be set to switch off the heater 19 when the voltage output of subtractor 35 drops to a level of 3–5 volts, as a specific example.

While the foregoing description has been directed to the specific application of drifting lithium diffusants from the n-region into the p-region of a semiconductor wafer of silicon, it will be appreciated that the method and apparatus is also applicable to formation of nuclear particle detectors from semiconductor wafers of materials other than silicon and to the drifting of other ionized donor atoms from the n-region into the p-region, such for example as sodium or copper donor atoms.

While but one specific form of the present invention has been particularly shown and described, it will be apparent that various modifications may be made within the spirit and scope of the invention, and it is desired, therefore, that only such limitations be placed thereon as are imposed by the prior art and set forth in the appended claims.

What is claimed is:

1. The method of ion drifting a semiconductor wafer having an n-type region containing diffused ionized donor atoms and a p-type region to drift the ionized donor atoms into the p-type region and thereby form a compensated i-zone between said regions characterized by higher specific resistivity than said regions for use as a nuclear particle detector, comprising the steps of heating said wafer to maintain the wafer at a temperature of between about 90° C. and 150° C., applying a reverse bias to said wafer to effect drifting of the donor atoms from said n-type region into said p-type region to establish an i-zone therebetween reducing the thickness of said p-type region to a selected minimum thickness, irradiating said wafer during heating and application of reverse bias to said wafer by subjecting the wafer to pulsed radiation energy in frequency bands which produce carriers in the i-zone thereof to produce current pulses of fast rise time denoting creation of carriers in said i-zone, and detecting the number of carriers produced in said i-zone responsive to said radiation energy to provide an indication of the thickness of the p-type region.

2. The method of lithium drifting a semiconductor wafer having an n-type region containing diffused lithium and a p-type region to drift lithium into the p-type region and thereby form a compensated i-zone between said regions characterized by higher specific resistivity than said regions for use as a nuclear particle detector, comprising the steps of heating said wafer to maintain the wafer at a temperature of between about 90° C. and 150° C., applying a reverse bias to said wafer to effect drifting of lithium from said n-type region into said p-type region to establish an i-zone therebetween reducing the thickness of said p-type region to a selected minimum thickness, irradiating said wafer during heating and application of reverse bias to said wafer by subjecting the wafer to pulsed radiation energy in frequency bands which produce carriers in the i-zone thereof to produce current pulses of fast rise time denoting creation of carriers in said i-zone, and detecting the number of carriers produced in said i-zone responsive to said radiation energy to provide an indication of the thickness of the p-type region.

3. The method of processing a semiconductor silicon wafer or the like, for use as a nuclear particle detector having an n-type region containing diffused lithium adjacent a first face of the wafer and a p-type region adjacent a second face of the wafer by drifting lithium into the p-type region and thereby forming a compensated intrinsic zone of selected thickness between said regions characterized by higher specific resistivity than said regions to provide a detector wafer having a shallow p-type zone adjacent one face of the wafer to serve as a nuclear particle entrance window, comprising the steps of heating said wafer to maintain the wafer at a temperature of between about 90° C. and 150° C., applying a reverse bias across said faces of said wafer to effect drifting of lithium from said n-type region into said p-type region to establish a compensated intrinsic zone therebetween of a thickness of at least as deep as the range of penetration of the nuclear particles and leave a p-type region adjacent said second face of a selected minimum thickness, irradiating said wafer during heating and application of reverse bias to said wafer by subjecting said second face of the wafer to pulsed radiation energy in frequency bands which produce carriers in the intrinsic zone thereof to produce current pulses of fast rise time denoting creation of carriers in said intrinsic zone and detecting the number of carriers produced in said intrinsic zone responsive to said radiation energy to provide an indication of the thickness of the p-type region.

4. The method of controlling processing of a semiconductor silicon wafer, or the like, having an n-type region containing diffused lithium adjacent a first face thereof and a p-type region adjacent a second face thereof to produce a p-i-n detector for detection of nuclear particles by drifting lithium into the p-type region and thereby forming a compensated i-zone of selected thickness between said regions characterized by higher specific resistivity than said regions for use as a nuclear particle detector, comprising the steps of heating said wafer to maintain the wafer at a temperature of between about 90° C. and 150° C., applying a reverse bias across said faces of said wafer to effect drifting of lithium from said n-type region into said p-type region to establish an i-zone therebetween of a thickness at least as deep as the range of penetration of the nuclear particles covered by a shallow p-type region adjacent said second face serving as a nuclear particle entrance window, irradiating said wafer during heating and application of reverse bias to said wafer by subjecting said second face of the wafer to pulsed radiation energy in frequency bands which produce carriers in the i-zone thereof to produce current pulses of fast rise time denoting creation of carriers in said i-zone, detecting the number of carriers produced in said i-zone responsive to said radiation energy, and producing an output indication proportional to the thickness of said p-type region responsive to detection of the number of carriers produced.

References Cited

UNITED STATES PATENTS

| | | | |
|---|---|---|---|
| 3,212,943 | 10/1965 | Freck | 148—177XR |
| 3,225,198 | 12/1965 | Mayer | 148—188 |
| 3,272,668 | 9/1966 | Miller | 148—177 |

HYLAND BIZOT, *Primary Examiner.*